US011235229B1

(12) United States Patent
Khorana

(10) Patent No.: US 11,235,229 B1
(45) Date of Patent: Feb. 1, 2022

(54) TACTILE AND AUDIO-ENABLED GAMING

(71) Applicant: Rohit Khorana, San Jose, CA (US)

(72) Inventor: Rohit Khorana, San Jose, CA (US)

( * ) Notice: Subject to any disclaimer, the term of this patent is extended or adjusted under 35 U.S.C. 154(b) by 1 day.

(21) Appl. No.: 16/924,178

(22) Filed: Jul. 9, 2020

(51) Int. Cl.
*A63F 3/02* (2006.01)
*A63F 3/00* (2006.01)
*A63F 9/00* (2006.01)
*G09B 21/00* (2006.01)

(52) U.S. Cl.
CPC ............ *A63F 3/02* (2013.01); *A63F 3/00643* (2013.01); *A63F 9/0001* (2013.01); *G09B 21/006* (2013.01); *A63F 2009/0003* (2013.01); *A63F 2009/0004* (2013.01); *A63F 2250/02* (2013.01); *Y10S 273/27* (2013.01)

(58) Field of Classification Search
CPC ...... A63F 3/02; A63F 3/0643; A63F 2250/02; A63F 3/00643; A63F 9/0001; A63F 2009/0003; A63F 2009/0004; G09B 21/006; Y10S 273/27
See application file for complete search history.

(56) References Cited

U.S. PATENT DOCUMENTS 4,268,255 A * 5/1981 Gillis ................. G09B 5/04
434/128
2007/0144720 A1* 6/2007 Harada ............... F28F 9/0224
165/173

OTHER PUBLICATIONS

Saitek Blade Instruction Manual, Saitek, Nov. 16, 2008, available at <<https://web.archive.org/web/20081116031348/http://www.saitek.com/manuals/blade.pdf>>. (Year: 2008).*
Chess for the Blind, Jun. 9, 2010, 9GAG, available at <<https://9gag.com/gag/25630>>. (Year: 2010).*
Mae Garcia, Chess Set for the Visually Impaired, Sep. 2019, Mae Garcia Industrial Designer, available at <<https://maegarciadesign.com/chess-set-for-the-visually-impaired>>. (Year: 2019).*
Jownjology, Meet Google Home mini | Voice Recognition Chess Mate : London System : Game# 1, Jan. 30, 2018, available at <<https://www.youtube.com/watch?v=vCEttQt_nt8>>. (Year: 2018).*
Rules of Chess, International Braille Chess Association, Aug. 7, 2019, available at <<https://web.archive.org/web/20190807080055/https://ibca-info.org/rules-of-chess.php>>. (Year: 2019).*

* cited by examiner

*Primary Examiner* — Werner G Garner
(74) *Attorney, Agent, or Firm* — Patent PC; Bao Tran

(57) ABSTRACT

Systems and methods are disclosed for playing a game by providing a board with tactile and/or sound annotations uniquely referencing play positions on the board; and providing tactile and/or audible pieces to be used with the tactile and sound-annotated board.

14 Claims, 7 Drawing Sheets

FIG. 1

|    |    |    |    |    |    |    |    |
|----|----|----|----|----|----|----|----|
| A8 |    |    |    |    |    |    |    |
| A7 |    |    |    |    |    |    |    |
| A6 |    |    |    |    |    |    |    |
| A5 |    |    |    |    |    |    |    |
| A4 |    |    |    |    |    |    |    |
| A3 |    |    |    |    |    |    |    |
| A2 |    |    |    |    |    |    |    |
| A1 | B1 | C1 | D1 | E1 | F1 | G1 | H1 |

FIG. 2

King

Queen

Rook

Bishop

Knight

TACTILE AND AUDIO-ENABLED GAMING

BACKGROUND

The present invention relates to a game for the blind.

Chess is a two-player board game using a chessboard and sixteen pieces of six types for each player. As shown in FIG. 1, a square board divided into 64 squares (eight-by-eight) of alternating color, which is similar to that used in draughts (checkers). The chess board has 64 squares, each of which is denoted by a coordinate pair A and H (wide), and 1 and 8 (length). The lighter-colored squares are called "light" or "white", and the darker-colored squares are called "dark" or "black". Sixteen "white" and sixteen "black" pieces are placed on the board at the beginning of the game. The board is placed so that a white square is in each player's near-right corner. Horizontal rows are called ranks and vertical rows are called files.

While challenging for people with eye-sights, existing solutions provided are highly impractical and lead to inaccuracy when utilized by blind users.

SUMMARY

Systems and methods are disclosed for playing a game by providing a board with tactile and/or sound annotations uniquely referencing play positions on the board; and providing tactile and/or audible pieces to be used with the tactile and sound-annotated board.

Implementations may include one or more of the following. The method includes encoding or embossing a chess board with Braille text and playing chess on a Braille chessboard. The method includes encoding or embossing a chess piece with Braille text and playing chess with the Braille encoded piece. The method includes providing embossed king, queen, rook, bishop, pawn and knight pieces to play on the tactile board. The method includes providing embossment or encoding on top of each tactile piece, wherein the embossment or encoding is selected from a group consisting of: king, queen, rook, bishop, pawn and knight pieces. The method includes providing sound associated with a position on the chess board. The method includes providing sound associated with the chess piece. The method includes providing sound for each of a king, queen, rook, bishop, pawn, and knight piece. The method includes providing embossment or encoding on top of each tactile piece, wherein the embossment or encoding is selected from a group consisting of: king, queen, rook, bishop, pawn, and knight pieces. The method includes providing a unique sound for each piece. The chess board may have a matrix of keypress sensors which are connected to the Arduino board. This helps Arduino to determine which key is pressed. In addition, a processor such as an Arduino board is connected to a SD card reader which helps load the audio files which Arduino can access. Distinct files are played when each Arduino key is pressed. It helps also to have sounds played in different languages. There is a speaker connected to Arduino to play the sound. There is a keypress sensor connected to a wireless unit such as Wifi transmitter in each chess piece. The chess pieces Wifi is registered to the specific Wifi Controller on the Arduino. When the chess piece is pressed, it sends a code to the Arduino to which it is connected, which detects the code and plays the chess piece type. This is all in addition to the Braille markings on the chess squares as well as braille markings on the chess pieces. Also, there are decorative markings on each chess piece to identify them. This is for cases where a normal person is playing a deaf or blind chess player. Other possibilities include implementing a natural language processing algorithm which can convert a user's spoken move into a physical move on a board (implemented via a system of trap doors, gears, motors as known to one skilled in the art. In other embodiments, the movements of the pieces can be tracked by magnets. In another embodiment, the chess processor can answer spoken questions from a user such as: "Where is my knight?" or "Is my king castled?" or "Where is the opponent's bishop?" and based on the detected position the system can reply with the coordinates of the desired piece in response to the query.

Advantages of the system may include one or more of the following. The system reduces the difficulty faced by disabled or blind people who wish to play chess.

BRIEF DESCRIPTION OF THE DRAWINGS

The invention will now be described in detail. Since this game is based on the concepts of conventional chess, obvious rules of chess applying to this invention are not described, except when required for clarity. The chess terminology used has the same or similar meaning as in conventional chess, unless otherwise stated.

FIG. 1 shows a conventional chess board.

FIG. 2 shows an exemplary braille chess board.

FIG. 7 shows exemplary electronics used in the chess board.

DESCRIPTION

The preferred embodiment of the invention will first be described with the help of the drawings. Other possible embodiments are discussed at the end of this section.

Figures 1, 2:
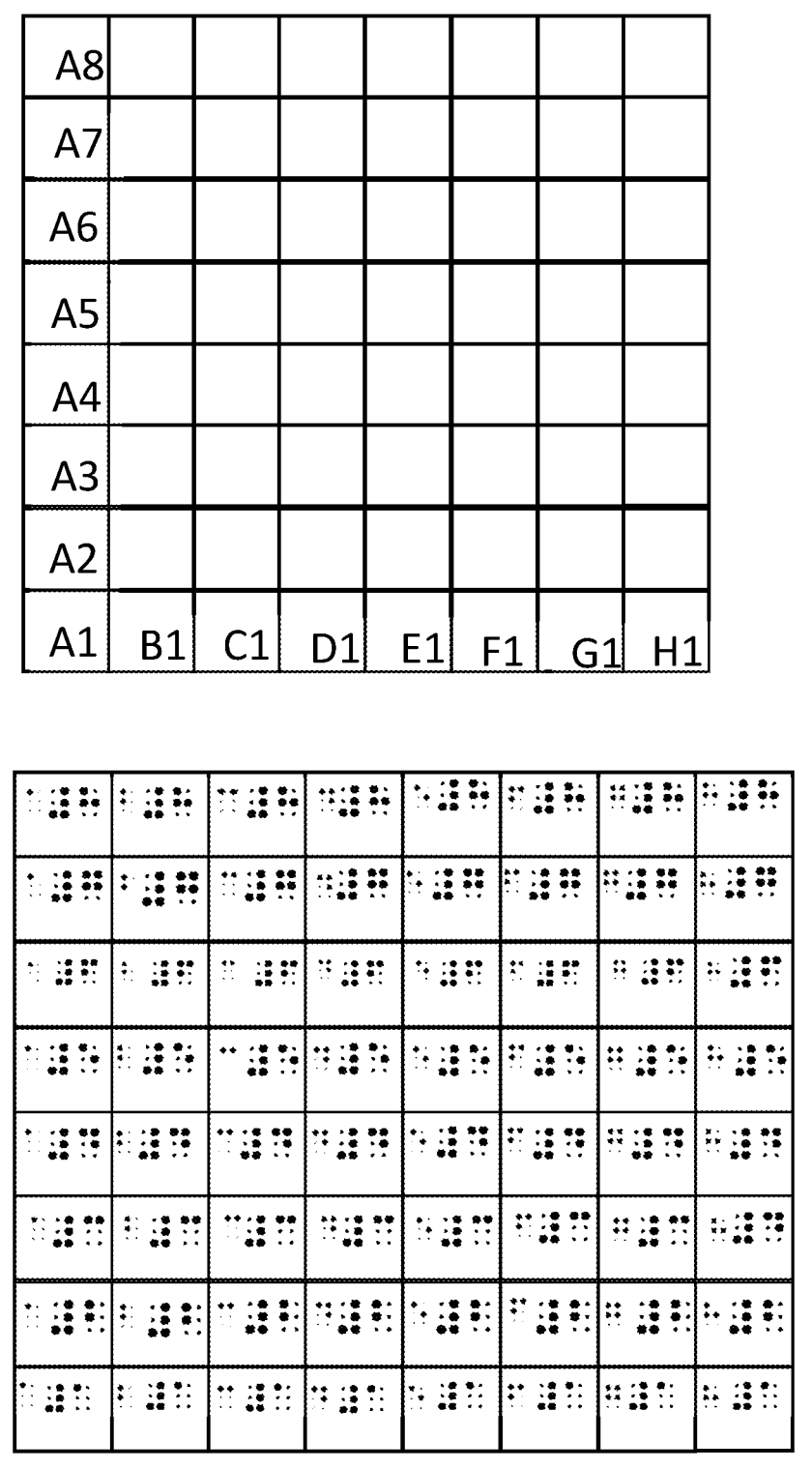

FIG. 2 shows an exemplary Braille chess board. However, simply hearing the notation by another person or player, is inadequate. The blind player needs to perform visualization of the entire board, a mentally exhausting task. The preferred embodiment uses braille (the standard means of processing written information for the blind) as markings to each square. This can decrease the memory intensity of the task as the player will know which square he/she is touching.

Braille can be printed on the chess board as embossed paper. In computer embodiments of the chess boards, Braille players can read computer screens and other electronic supports using refreshable braille displays. These characters have rectangular blocks called cells that have tiny bumps called raised dots. The number and arrangement of these dots distinguish one character from another. Since the various braille alphabets originated as transcription codes for printed writing, the mappings (sets of character designations) vary from language to language, and even within one; in English Braille there are three levels of encoding: Grade 1—a letter-by-letter transcription used for basic literacy; Grade 2—an addition of abbreviations and contractions; and Grade 3—various non-standardized personal stenography. Braille cells are not the only thing to appear in braille text. There may be embossed illustrations and graphs, with the lines either solid or made of series of dots, arrows, bullets that are larger than braille dots, etc. A full braille cell includes six raised dots arranged in two columns, each column having three dots. The dot positions are identified by numbers from one to six. There are 64 possible combinations, including no dots at all for a word space. A cell can be used to represent a letter, digit, punctuation mark, or even a word.

Figure 3:
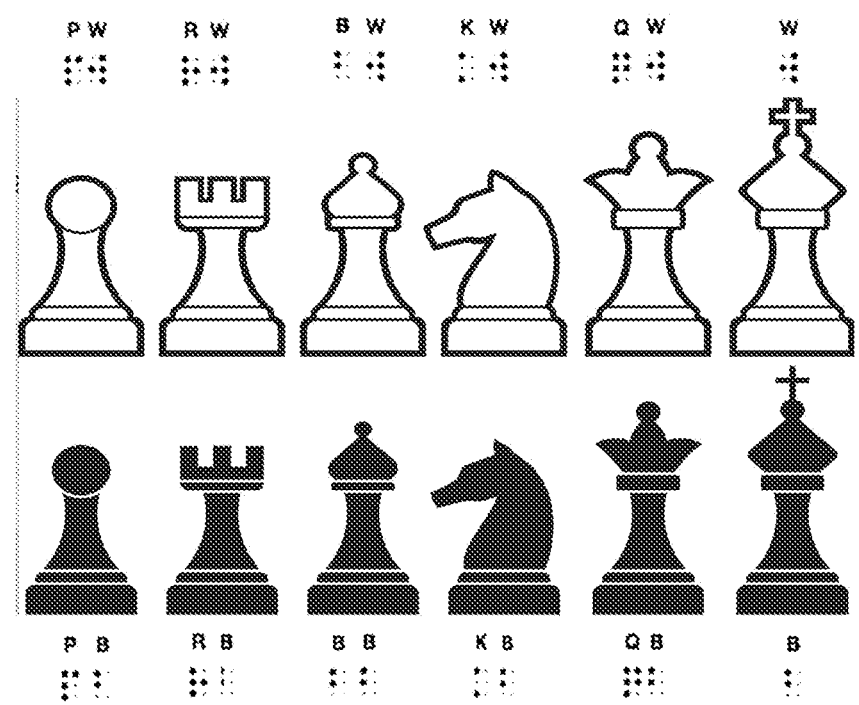
FIG. 3 shows exemplary braille chess pieces to be played with the board of FIG. 2.
Figure 3:
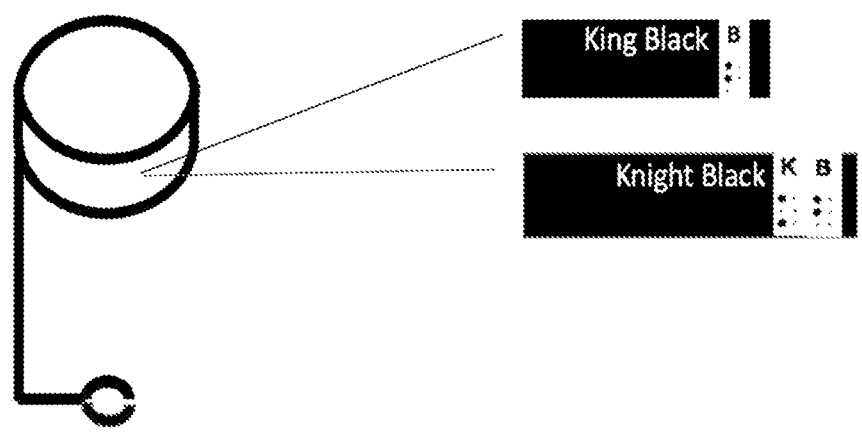

FIG. 3 shows exemplary Braille chess pieces to be played with the Braille board of FIG. 2. The chess pieces are Embossed with Braille letters to enable players to identify the pieces using touch. In one embodiment, the piece has embedded Braille data on the surface or the side. As illustrated in FIG. 3, the Braille piece identification is on the side of the piece.

In addition to touch identification as illustrated in FIGS. 2-3, sound is used in tandem with touch to convey information to the player. In one embodiment illustrated in FIG. 4, chess squares which, like keys on a keyboard, play different sounds when pressed. The system includes providing multiple sources of verification to the user, regarding which square is pressed by the chess piece. In one embodiment, the sound can be calibrated to a user's preference: either morse code or various pitches perhaps even the notation spoken aloud in English or another language.

Figure 4:
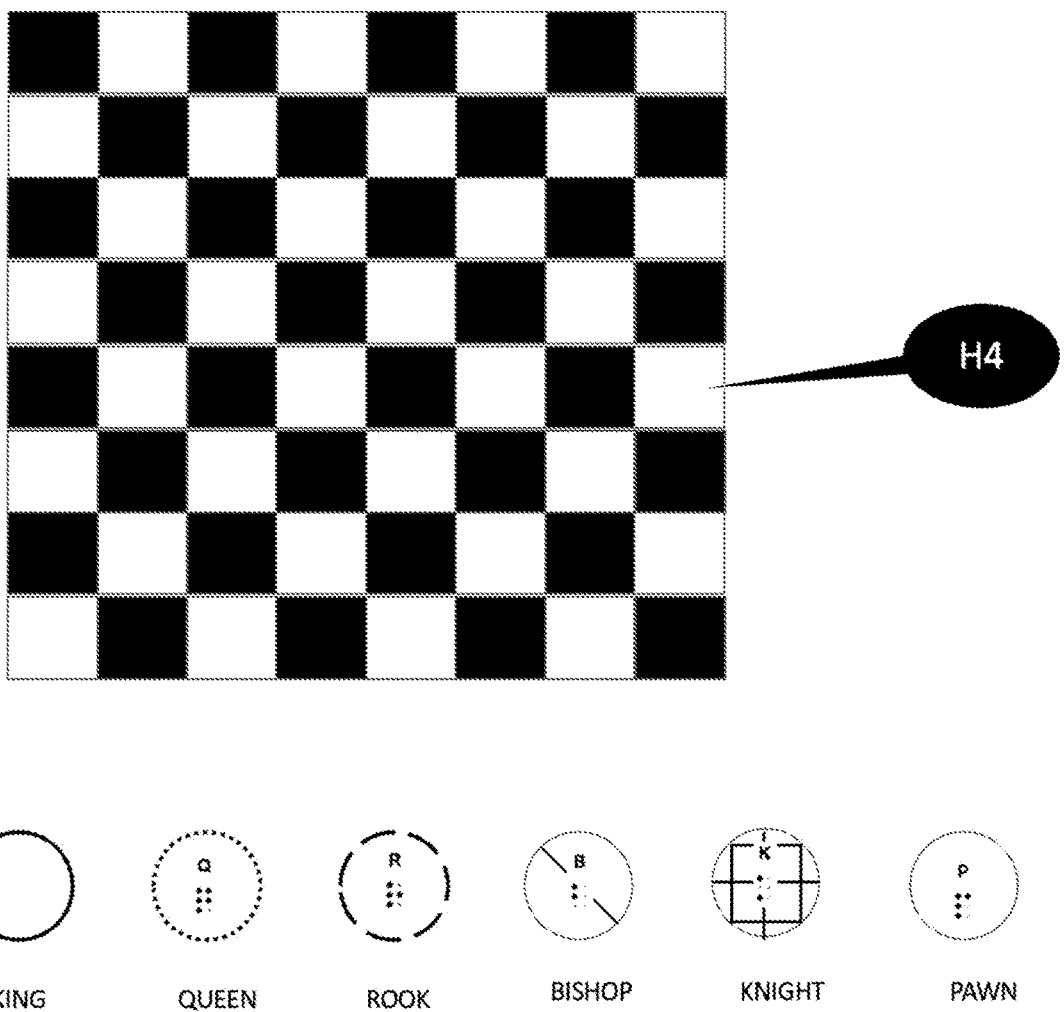
FIG. 4 shows exemplary sound-enabled chess board and chess pieces.
Figure 5A:
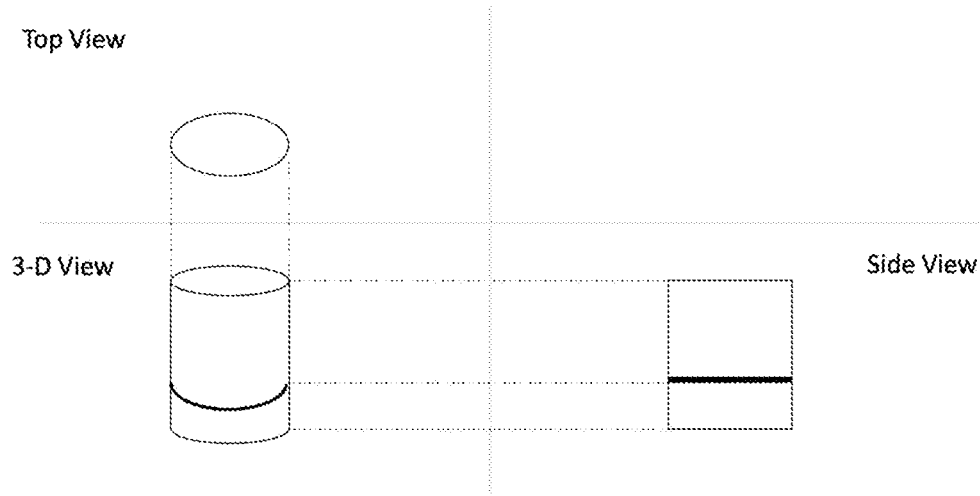
FIGS. 5A-5E show in more details exemplary sound-enabled chess pieces.
Figure 5B:
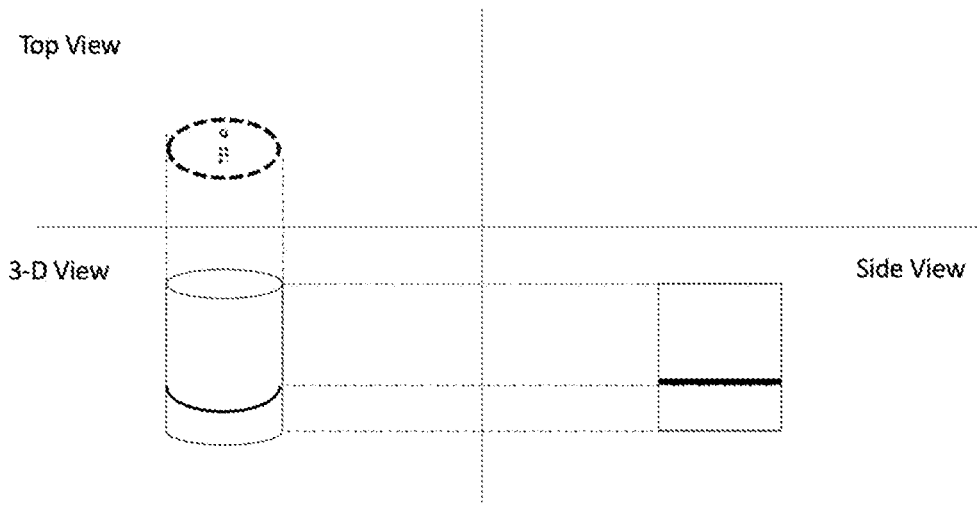
Figure 5C:
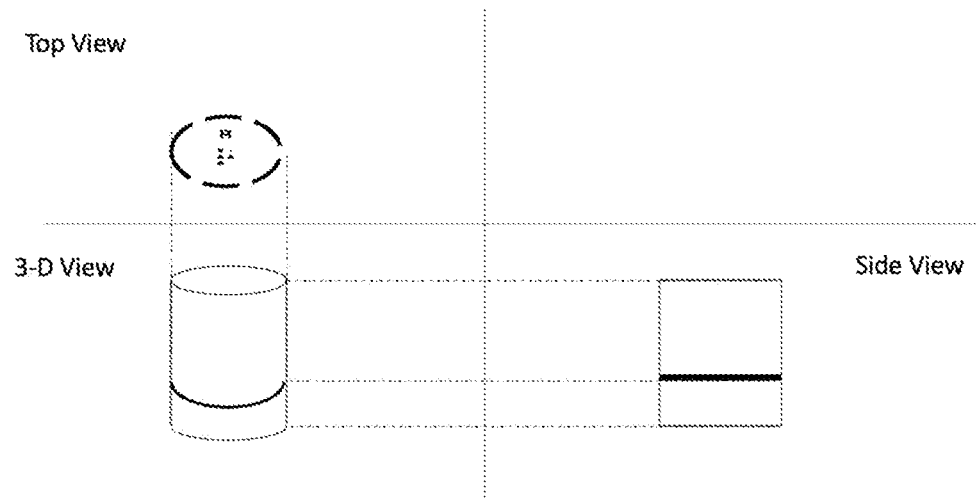
Figure 5D:
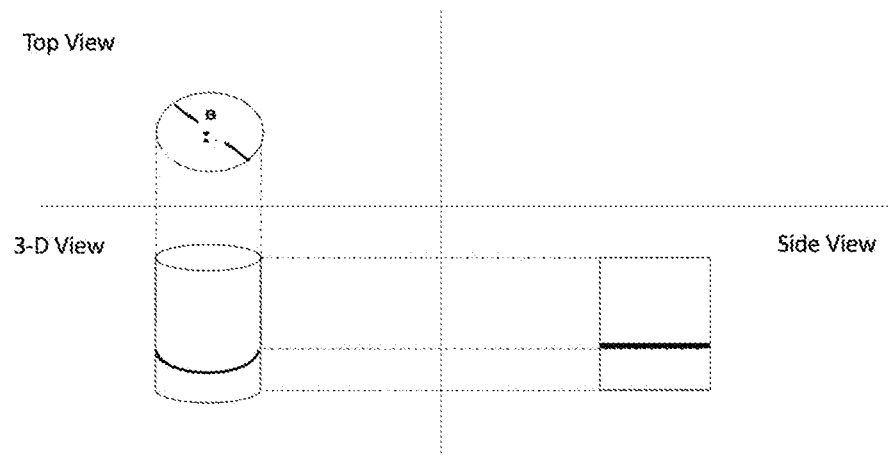
Figure 5E:
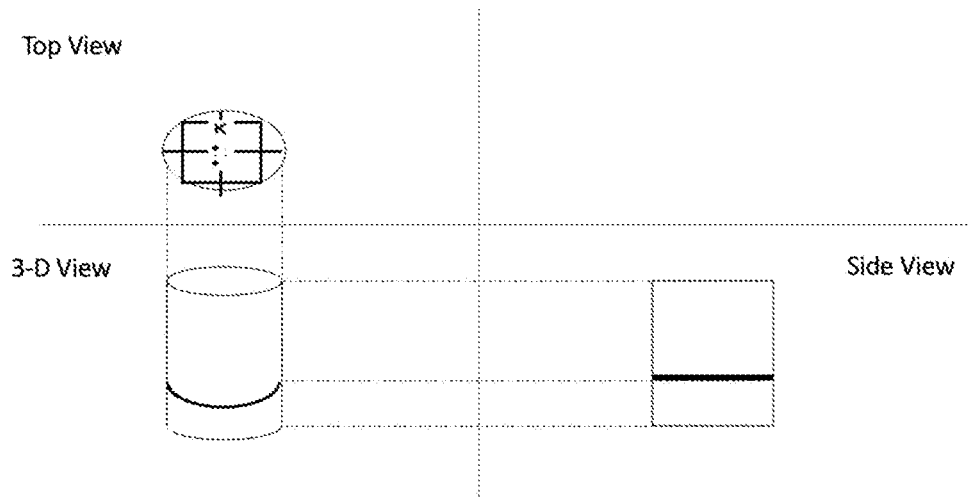

FIG. 4 shows exemplary sound-enabled chess board and chess pieces. The squares on the chess board, in addition to the Braille markings can also be clicked. If 'clicked', they will play the sound of their position. These pieces can be pressed to play a sound which indicates which color and type of piece are they, eg: Black King, White Bishop-Black Square, etc. The symbols of various pieces are detailed next.

FIGS. 5A-5E show in more details exemplary sound-enabled tactile chess pieces. In these pieces, the piece identification is formed as Braille text on top, and a gap is formed on the side so that when the piece is pressed, squeezed, or clicked, a unique sound is played to uniquely identify the piece ID by sound. In this manner, the blind players can hear and sense the piece via touch.

Each side starts with 16 tactile and sound-enabled pieces: eight pawns, two bishops, two knights, two rooks, one queen, and one king. When a game begins, each side starts with eight pawns. White's pawns are located on the second rank, while Black's pawns are located on the seventh rank. The pawn is the least powerful piece and is worth one point. If it is a pawn's first move, it can move forward one or two squares. If a pawn has already moved, then it can move forward just one square at a time. It attacks (or captures) each square diagonally to the left or right.

Each side starts with two bishops, one on a light square and one on a dark square. The bishop is considered a minor piece (like a knight) and is worth three points. A bishop can move diagonally as many squares as it likes, as long as it is not blocked by its own pieces or an occupied square. An easy way to remember how a bishop can move is that it moves like an "X" shape. It can capture an enemy piece by moving to the occupied square where the piece is located. Each side starts with two knights—a king's knight and a queen's knight. The knight is considered a minor piece (like a bishop) and is worth three points. The knight is the only piece in chess that can jump over another piece! It moves one square left or right horizontally and then two squares up or down vertically, OR it moves two squares left or right horizontally and then one square up or down vertically—in other words, the knight moves in an "L-shape." The knight can capture only what it lands on, not what it jumps over. Each side starts with two rooks, one on the queenside and one on the kingside. All four rooks are located in the corners of the board. The rook is considered a major piece (like the queen) and is worth five points. It can move as many squares as it likes left or right horizontally, or as many squares as it likes up or down vertically (as long as it isn't blocked by other pieces). The queen is the most powerful chess piece! When a game begins, each side starts with one queen. The queen is considered a major piece (like a rook) and is worth nine points. It can move as many squares as it likes left or right horizontally, or as many squares as it likes up or down vertically (like a rook). The queen can also move as many squares as it likes diagonally (like a bishop). The king is the most important chess piece. Remember, the goal of a game of chess is to checkmate the king! The king is not a very powerful piece, as it can only move (or capture) one square in any direction.

Figure 6:
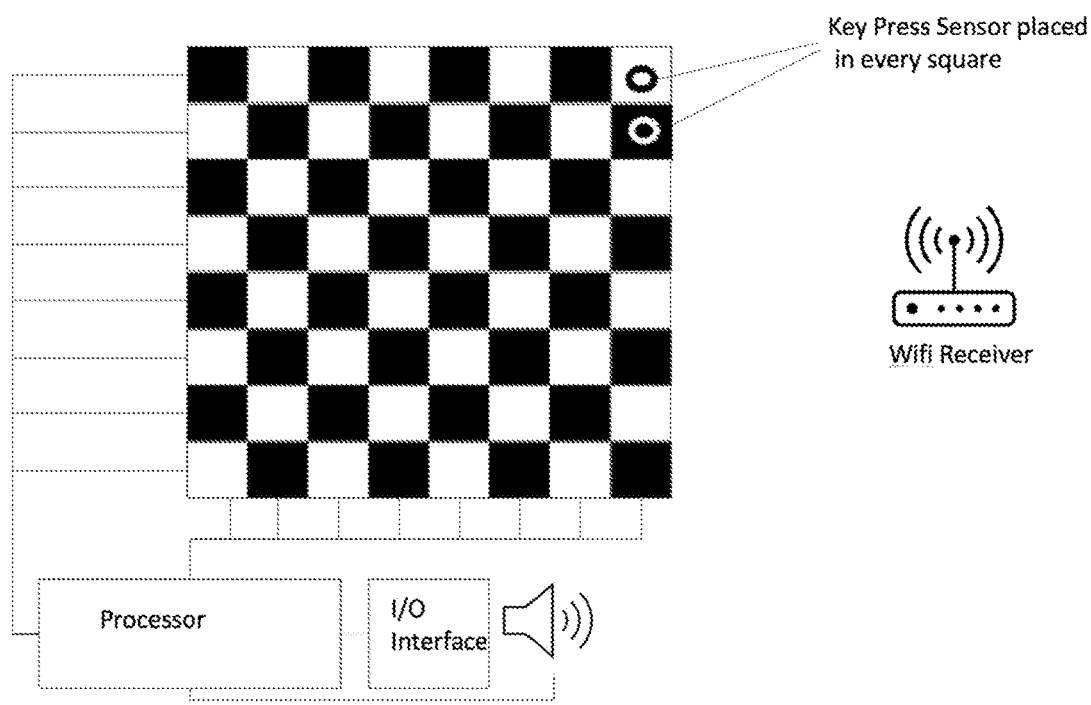
FIG. 6 shows an exemplary electronic chess board.

FIG. 6 shows an exemplary electronic chess board. The exemplary chess board has a matrix of keypress sensors which are connected to a chess processor board that can be a microcontroller or central processor. The processor determines which key is pressed, i.e. which chess square is pressed via polling similar to key closure detection. In addition, the chess processor is connected to a memory card reader which helps load the audio files from suitable flash memory which the processor can access. Distinct files are played when each chess processor key is pressed. It helps also to have sounds played in different languages. There is a speaker connected to the processor to play the sound. Additionally, a key press sensor is connected to a transmitter in each chess piece which can be Bluetooth, Zigbee, or Wifi transmitter, for example. The chess pieces' wireless transmitters are registered to the specific addresses on the chess processor. When the chess piece is pressed, it sends a code to the chess processor which detects the code and plays the chess piece type sound. This functionality can be obtained via chess processor, audio files, loaded onto an SD card, and an SD card reader+slot present on the board. For example, whenever a button/square is pressed, a user can hear the sound of each square. In order to further ensure that each piece is recognized the addition of markings on each individual piece (in braille or a more compact unique symbol) can be added. In order to ensure each marking is found more easily, impressions (roughly the size of a finger) can be placed on each piece. In each impression a symbol can be located. In one implementation, such a system can contain a small flat cylindrical extrusion to denote dark squared and a pointed cone like extrusion one for light squared (materials to prevent any chance of injury should be considered) as well as unique symbols for each piece 1=king, 2=queen, 3=rook, 4=bishop, 5=knight, 6=pawn. Another implementation includes the ability to squeeze each piece from the sides to play a recording (in English or another language). Haptic feedback can be a way to confirm if a user is actually pressing the sides of each piece. To ensure each square has defined boundaries one embodiment can offset the height of every other square (the dark ones being a centimeter or two below the white squares. This can ensure the pieces are placed inside the squares and not on a boundary.

The embedding of a wireless transmitter in each piece and a corresponding receiver in the Chess processor. So now, the processor not only receives a key code from chess board, but also gets codes for each piece over wireless communication. This capability can be utilized to tell a user if an illegal move is made (e.g. moving the knight five steps forward). Additionally, when prompted for by a user the chess processor can notify (via a Bluetooth receiver to a smartphone) the position of every piece on the board (both white and black). In one embodiment, the Wifi transmitter is in the Pawn, King, Queen, Bishop, Knight and Rook play pieces.

Other possibilities include implementing a natural language processing algorithm which can convert a user's spoken move into a physical move on a board (implemented via a system of trap doors, gears, motors as known to one skilled in the art. In other embodiments, the movements of the pieces can be tracked by magnets. In another embodiment, the chess processor can answer spoken questions from a user such as: "Where is my knight?" or "Is my king castled?" or "Where is the opponent's bishop?" and based on the detected position the system can reply with the coordinates of the desired piece in response to the query.

Each sound-enabled tactile piece type moves in a distinct way. The object of the game is to checkmate (threaten with inescapable capture) the opponent's king. At the beginning of the game, the pieces are arranged as follows in one embodiment: for each side one king, one queen, two rooks, two bishops, two knights, and eight pawns.

The sound-enabled tactile pieces are placed, one on a square, as follows:

The sound-enabled tactile rooks are placed on the outside corners, right and left edge.

The sound-enabled tactile knights are placed immediately inside of the sound-enabled tactile rooks.

The sound-enabled tactile bishops are placed immediately inside of the sound-enabled tactile knights.

The sound-enabled tactile queen is placed on the central square of the same color of that of the player: white queen on the white square and black queen on the black square.

The sound-enabled tactile king takes the vacant spot next to the sound-enabled tactile queen.

The sound-enabled tactile pawns are placed one square in front of all of the other pieces.

The player controlling the sound-enabled tactile white pieces is named "White"; the player controlling the sound-enabled tactile black pieces is named "Black". White moves first, then players alternate moves. Making a move is required; it is not legal to skip a move, even when having to move is detrimental. Play continues until a king is checkmated, a player resigns, or a draw is declared, as explained below. In addition, if the game is being played under a time control, players who exceed their time limit lose the game.

Other means of indication are possible. For example, the piece could have a set of removable hats, either color-coded or with indicia, so a different hat could be fitted on top of the piece, so as to indicate a different choice of moves. Yet another method would be to have battery and electronic components located inside the shaft of the piece, and a switching mechanism and light indicators on the body of the piece to provide such means of indication. The switching mechanism would activate the light indicators operated by the battery and the electronic components, as known by those skilled in the art.

The present system is not limited to the specifically disclosed embodiment, and variations may be made without departing from the scope of the present system. Furthermore, various systems may be achieved by appropriately combining plural elements disclosed in the above embodiments. For example, some of the elements may be eliminated from each embodiment. Furthermore, elements of different embodiments may be appropriately combined.

What is claimed is:

1. A method to play a game, comprising:

providing a board having squares each with Braille tactile annotation on an upper portion of each square of the board for uniquely referencing play positions on the board;

providing pieces to be used with the board; and embossing each piece with Braille text on an upper side portion of each piece and playing chess with the pieces with a unique sound for each piece, wherein the board includes a matrix of key sensors connected to a processor to determine when a key is pressed, wherein the processor is connected to a speaker to load and play audio files where different audio files are played when each key is pressed, further comprising a transmitter in each piece and when each piece is pressed, the piece sends a code to the processor to detect and play the audio file for the piece.

2. The method of claim 1, comprising embossing the board with Braille text.

3. The method of claim 1, comprising providing sound associated with a position on the board.

4. The method of claim 1, comprising providing sound associated with the pieces.

5. The method of claim 1, wherein the pieces comprise embossed king, queen, rook, bishop, pawn, and knight pieces.

6. A method to play a game, comprising:

providing a board with language annotations uniquely referencing play positions of pieces on the board, wherein the board includes squares each with Braille tactile annotation; and providing the pieces with Braille embossing on sides of the pieces with a unique sound for each piece for playing chess, wherein the board comprises a matrix of key sensors which are connected to a processor to determine when a key is pressed, wherein the processor is connected to a speaker and a memory card reader to load an audio files and when each key is pressed, further comprising a transmitter in each piece and when the piece is pressed, the piece sends a code to the processor to detect and play the audio file for the piece.

7. The method of claim 6, comprising embossing the board with Braille text.

8. The method of claim 6, wherein the embossing is applied to a piece selected from a group consisting of king, queen, rook, bishop, and knight pieces.

9. The method of claim 6, comprising providing embossment on top of the piece, wherein the embossment is applied to a piece selected from a group consisting of: king, queen, rook, bishop, pawn, and knight pieces.

10. The method of claim 6, comprising providing sound for each of a king, queen, rook, bishop, pawn, and knight piece.

11. The method of claim 6, wherein the pieces comprise embossed king, queen, rook, bishop, pawn, and knight pieces.

12. A method to play a game, comprising:

providing a board with tactile and sound annotations uniquely referencing chess play positions on the board, wherein the board includes squares each with Braille tactile annotation on an upper portion of each square of the board for uniquely referencing play positions on the board; and providing Braille embossing on audible pieces to be used with the board, wherein Braille embossing is on upper sides of the audible pieces and wherein the audible pieces, when actuated provide audible guidance with a unique sound for each audible piece, wherein the board comprises a matrix of key sensors which are connected to a processor to determine when a key is pressed, wherein the processor is connected to a speaker and a memory card reader to load an audio file, further comprising a transmitter in each audible piece and when the audible piece is pressed, the audible piece sends a code to the processor to detect and play the audio file for the audible piece; and performing voice recognition.

13. The method of claim 12, comprising:

embossing the board with Braille text;

embossing an audible piece with Braille text.

14. The method of claim 12, wherein the pieces comprise embossed king, queen, rook, bishop, pawn, and knight pieces.

\* \* \* \* \*